Figure 1:
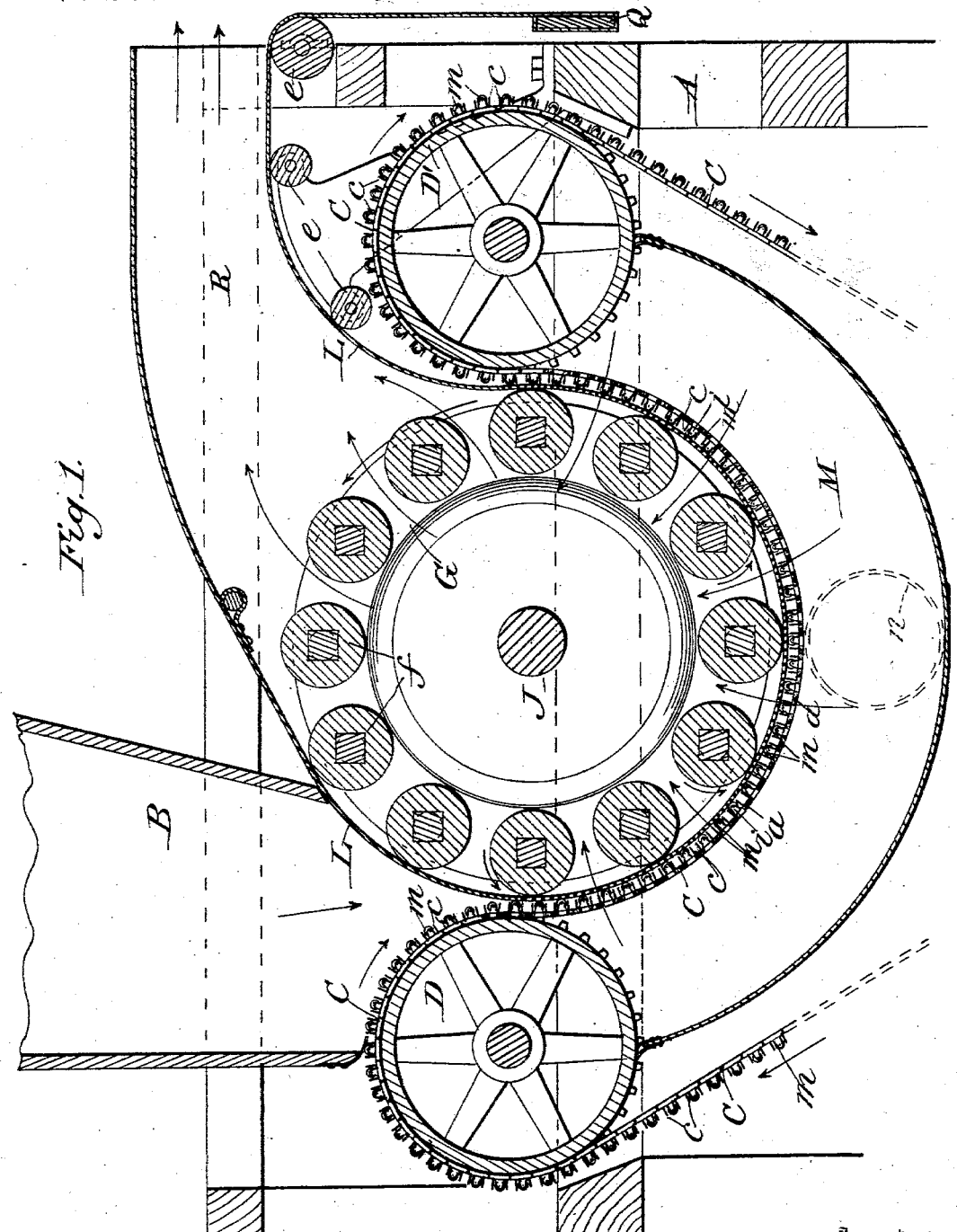

No. 633,994. Patented Oct. 3, 1899.
J. W. GRAVES.
COTTON GIN.
(Application filed Feb. 8, 1898.)

(No Model.) 5 Sheets—Sheet 1.

Witnesses
F. H. Schott
J. E. Hutchinson Jr.

Inventor:
John W. Graves,
by Nannie Goldsborough,
Attorneys.

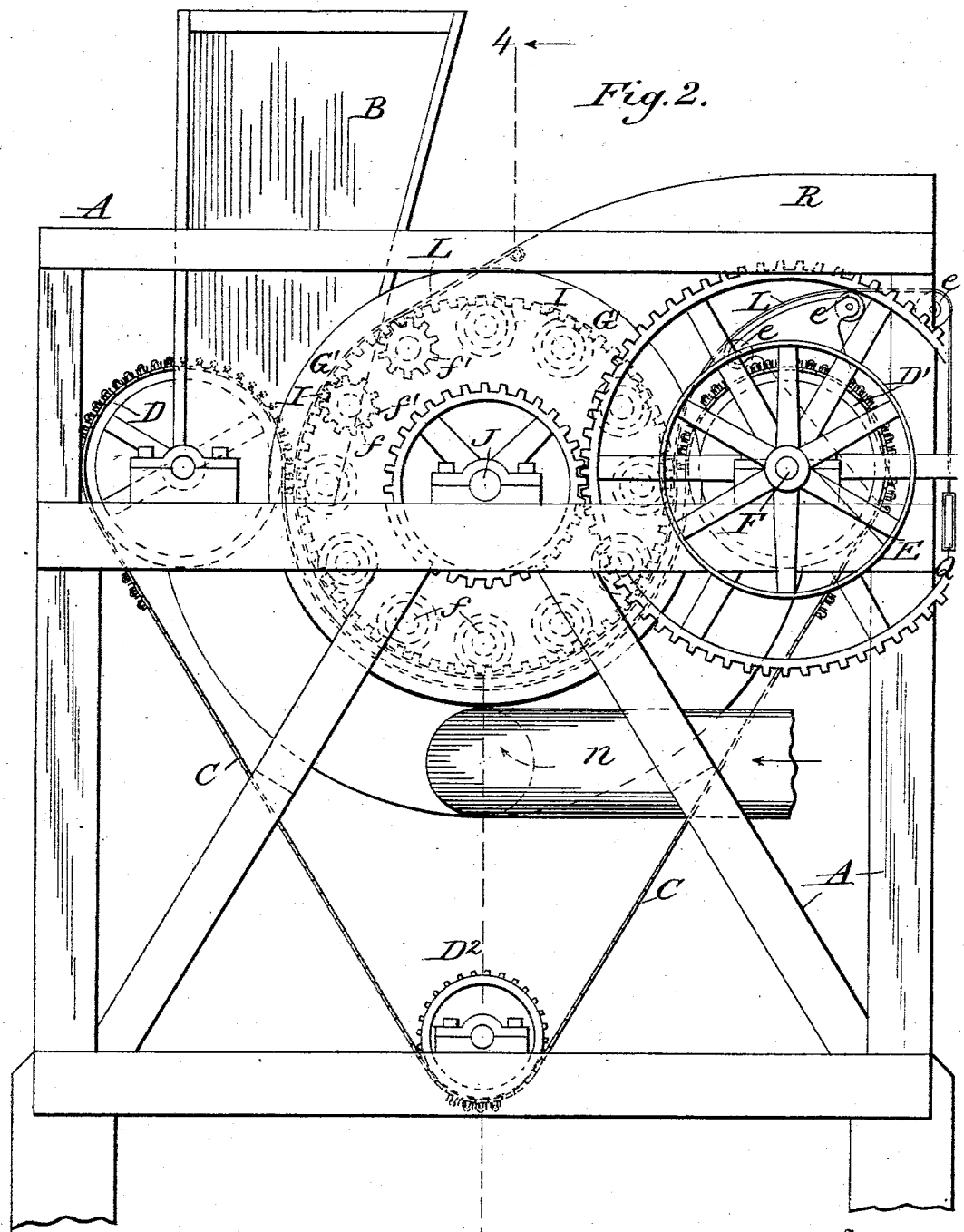

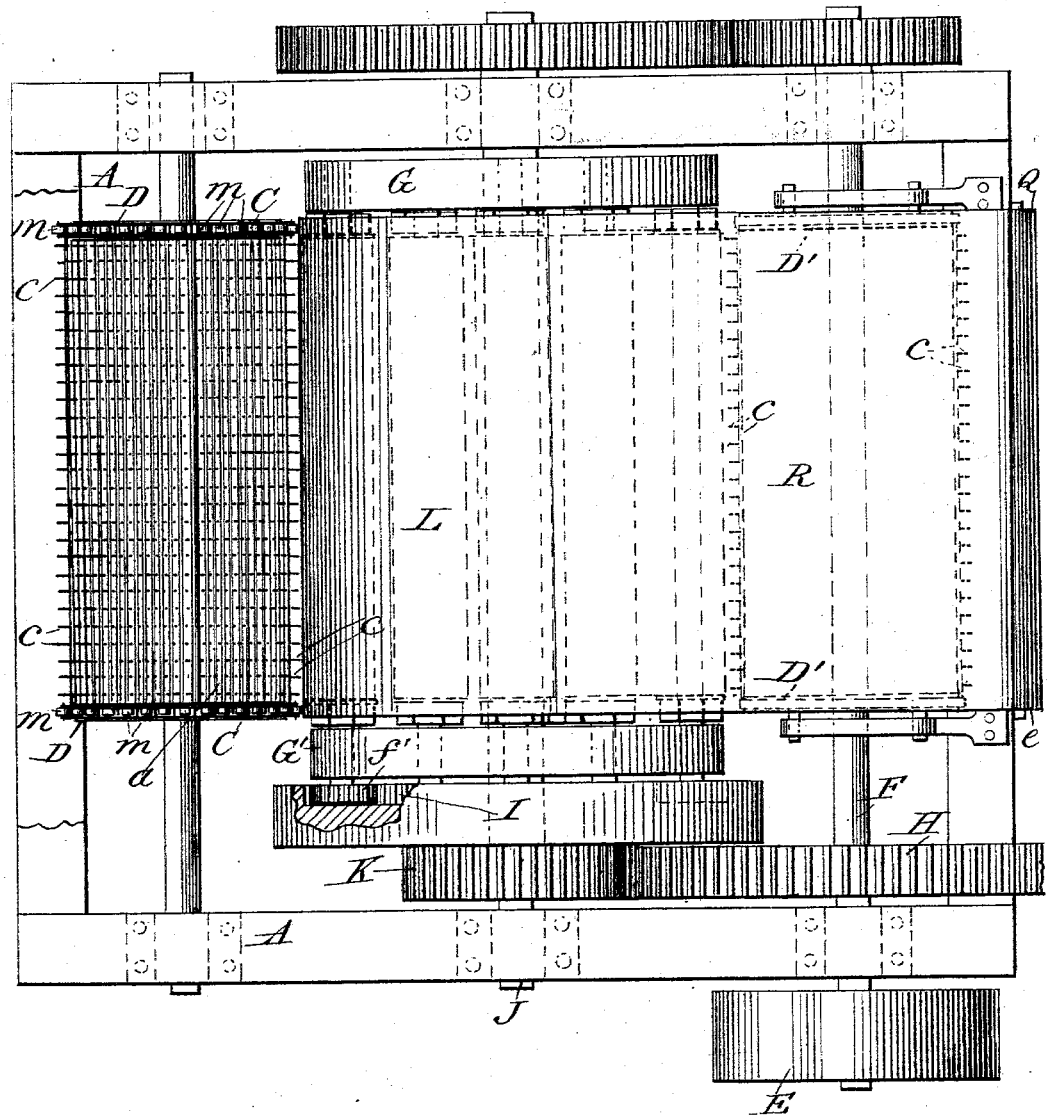

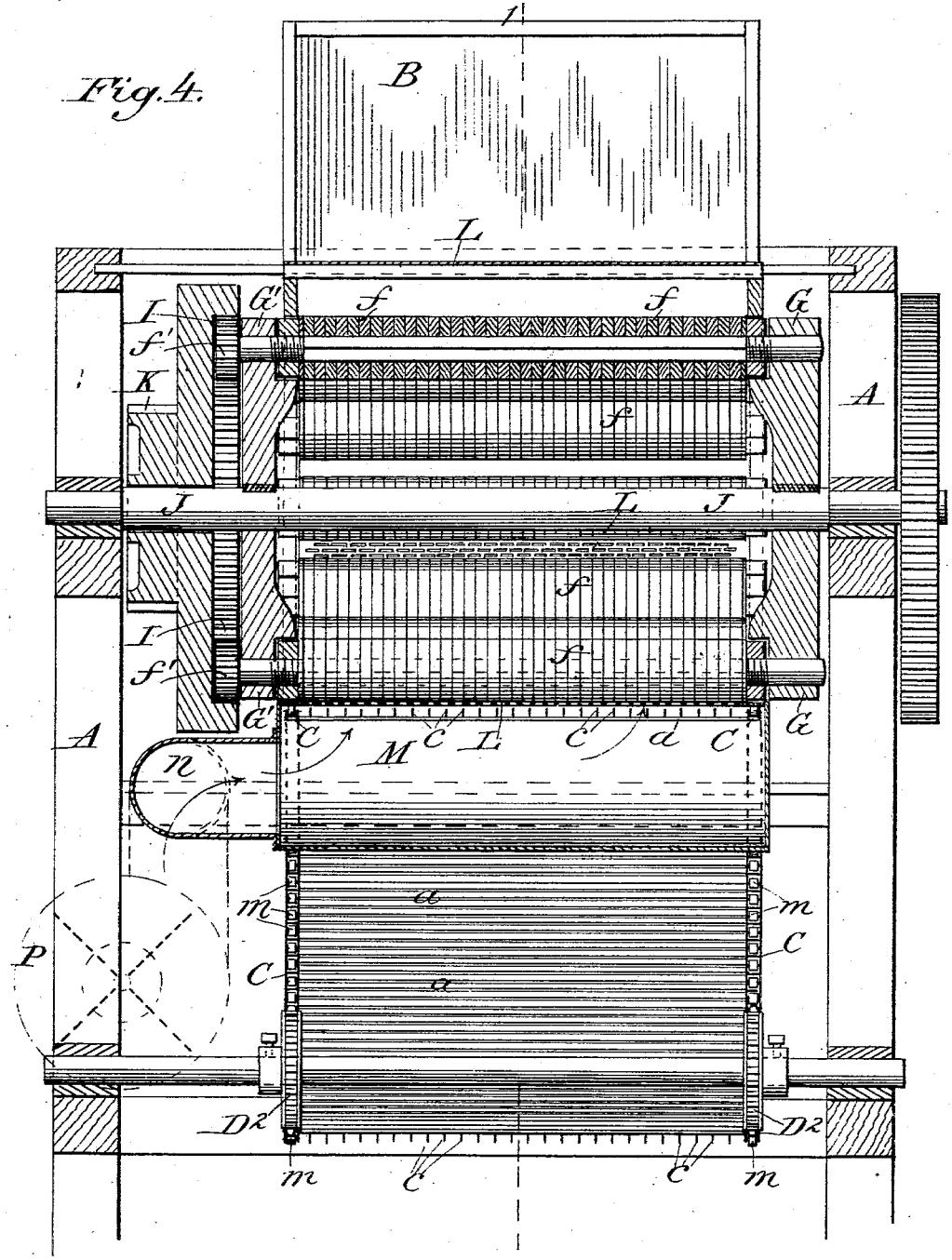

No. 633,994. Patented Oct. 3, 1899.
J. W. GRAVES.
COTTON GIN.
(Application filed Feb. 8, 1898.)
(No Model.) 5 Sheets—Sheet 5.
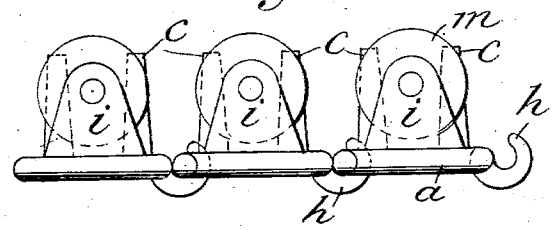
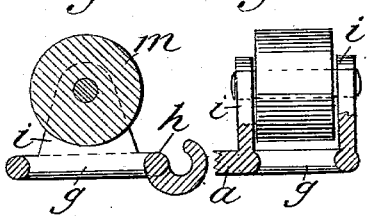
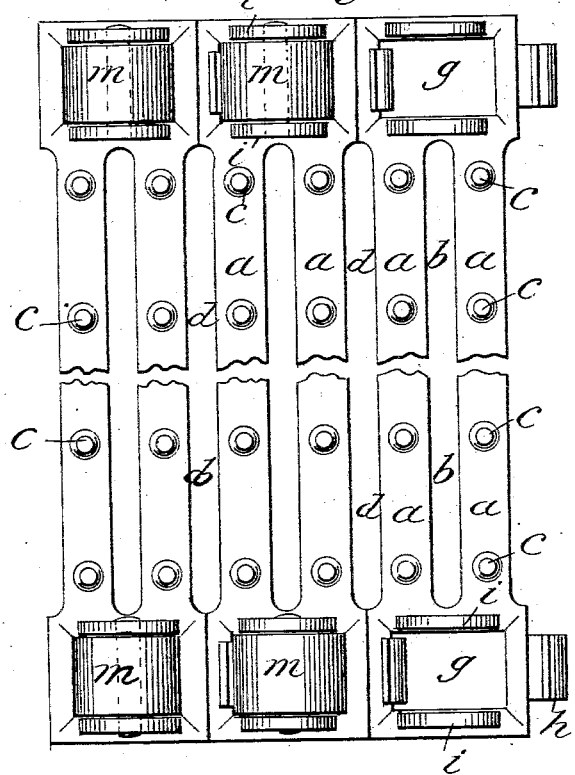
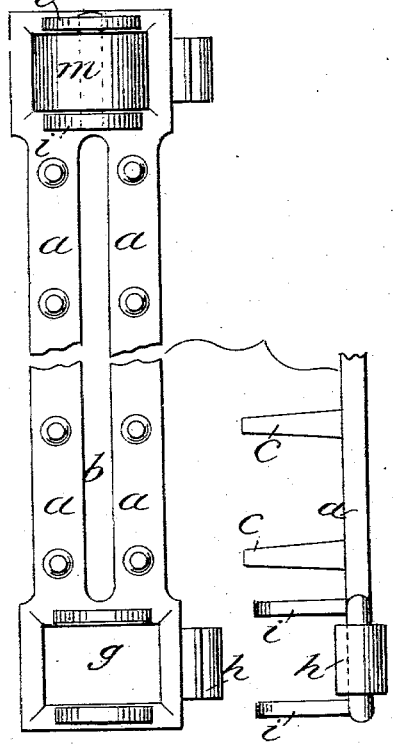

UNITED STATES PATENT OFFICE.

JOHN W. GRAVES, OF LITTLE ROCK, ARKANSAS.

COTTON-GIN.

SPECIFICATION forming part of Letters Patent No. 633,994, dated October 3, 1899.

Application filed February 8, 1898. Serial No. 669,602. (No model.)

*To all whom it may concern:*

Be it known that I, JOHN W. GRAVES, a citizen of the United States, residing at Little Rock, in the county of Pulaski and State of Arkansas, have invented certain new and useful Improvements in Cotton-Gins; and I do hereby declare the following to be a full, clear, and exact description of the invention, such as will enable others skilled in the art to which it appertains to make and use the same.

Prior to my present invention the employment of roller-gins for delinting seed-cotton has been comparatively limited for the reason that despite the generally-recognized superiority of the product which they deliver their mode of operation is so slow and tedious that the improved quality of the product does not compensate for the relatively very small output of the apparatus.

It is the object of my invention to remedy this deficiency by providing a roller-gin of high speed and quick and effective action having a capacity of production commensurate with that of the highest type of saw-gins and yielding a product or staple of the quality expected from a gin having a roller action.

In carrying out my invention I convey the seed-cotton to be delinted along the face of a perforated screen and during its travel I cause the lint to enter the screen-perforations and finally to be drawn entirely through said perforations and delivered to the lint-flue, the delinted cotton-seed passing onwardly to a convenient point of collection. My preferred means for causing the lint to enter the screen-perforations is a pneumatic device adapted to produce a current of air which, passing through the conveyer, will carry the lint into the perforations, whereupon it will be assisted in its passage therethrough by ginning devices located at the opposite side of the screen and moving in contact therewith. My preferred form of pneumatic device is a blower adapted to discharge its blast through the conveyer, the screen-perforations, and the ginning devices into the lint-flue. The ginning devices are preferably of the rotary type, and in the particular embodiment of the invention illustrated in the drawings they consist of a series of rollers spaced apart and mounted in a frame which receives a movement of rotation and to which each of the rollers is connected by multiplying-gearing in such manner that the individual rollers will each have a rotation much more rapid than that of the frame itself. In order to maintain intimate contact between the screen and the rotatory ginning-rollers, I provide means for exerting a longitudinal strain or pull upon the end of the screen by means of a weight or its equivalent which serves as an automatic take-up to compensate for such wear as may from time to time occur. The seed-cotton conveyer is of a construction permitting it to effectively move the seed-cotton along the screen, while at the same time permitting the passage of the current of air necessary for the entrainment of the lint into the screen-perforations.

The characteristic features of my invention, as above set forth, are particularly pointed out in the claims forming a part of this specification.

In the drawings, Figure 1 represents a longitudinal central section of an apparatus embodying my invention on the line 1 1 of Fig. 4. Fig. 2 represents an end elevation thereof. Fig. 3 represents a top plan view, partly in section. Fig. 4 represents a section on the line 4 4 of Fig. 2. Fig. 5 represents an end view, on a larger scale, of a portion of the seed-cotton conveyer. Fig. 6 represents a top plan view thereof. Fig. 7 represents a top plan view of one of the links of the conveyer-chain with one of its friction-rollers removed, and also a side elevation of a portion of one of said links. Fig. 8 represents a sectional view of one of the friction-rollers and its adjacent parts, and Fig. 9 represents the face view thereof.

Similar letters of reference indicate similar parts throughout the several views.

Referring to the drawings, A indicates a suitable framework for the apparatus, within which the operative parts are mounted.

B indicates a hopper for the reception of the seed-cotton, and C a conveyer receiving the seed-cotton from the hopper, said conveyer consisting, preferably, of a sprocket-chain passing over the sprocket-gears D D' D² and driven from a pulley E, fixed upon the power-shaft F.

Between the upper sprocket-gears D D' are located the ginning devices, consisting in this instance of a rotatory frame provided with two heads G G', within which are journaled the cylindrical ends of the shafts of a series of rollers $f$. The extreme ends of the shafts of the ginning-rollers $f$ are provided with pinions $f'$, which mesh with the teeth of a gear I, fixed upon the shaft J and rotated by means of a pinion K, also fixed upon the shaft J and deriving its rotation from a gear H upon the power-shaft F. The relation of the gearing is such that during one revolution of the gear I, and consequently of the rotatory frame, the individual gin-rollers $f$ will receive an independent axial rotation at a much higher rate of speed. In practice I prefer in most instances to impart a revolution of sixty turns a minute to the rotary frame and three hundred and sixty turns a minute to the individual gin-rollers by means of the multiplying-gearing described.

Intermediate of the conveyer and the rotatory gin-rollers $f$ is located the flexible screen L, which may be of sheet metal, provided at its central portion with series of perforations breaking joint with each other, as indicated clearly in Fig. 4. Beyond the perforations referred to the outlying edges of the screen are preferably imperforate, so as to serve as a suitable track for the friction-rollers of the conveyer. The screen for a portion of its length envelops the series of gin-rollers and its outlying free end is borne upon idlers $e$ and finally depends or hangs down at the rear of the apparatus, where it is put under longitudinal strain or tension by means of a weight Q or its equivalent. The function of the weight is to hold the screen in close contact with the rapidly-rotating gin-rollers and to compensate for any wear incident to the continued use of the apparatus, so that it subserves the function of an automatic take-up.

The seed-cotton conveyer is made up of a series of links of the desired length so cast or otherwise fashioned or constructed as to be of a skeleton or open pattern. The main body portion of the links is formed, preferably, of longitudinal bars $a$, separated from each other by an intervening longitudinal open space $b$, and provided with a series of projecting pins or fingers, and the main body portions of the adjacent links are so formed as to leave corresponding spaces $d$ between them. In this manner the conveyer throughout its entire extent is of an open pattern, the openings being of such dimensions as not to permit the seed-cotton to fall through them, but at the same time permit the passage of the necessary current of air incident to the operation of the apparatus. At their ends the links are provided with openings $g$ and with coöperating hooks $h$, whereby they are readily assembled, and on either side of the said openings are arranged standards $i$ for the reception of the journals of friction-rollers $m$, which are thus elevated correspondingly above the level of the main body portions of the link, as shown. The friction-rollers are adapted to run upon the outlying portions of the screen, beyond the perforations thereof, as hereinbefore described.

At any suitable point is stationed the pneumatic device consisting, preferably, of a fan-blower P, Fig. 4, discharging a current of air into a supply-conduit $n$, from which it enters an air-pressure chamber M in front of the conveyer and screen. In this chamber the pressure is equalized and distributed uniformly to the seed-cotton as it is conveyed over the screen.

The operation of the apparatus is as follows: The seed-cotton received from the hopper by the conveyer-chain is conducted along the front face of the screen. In its passage across the screen the air in the pressure-chamber M causes the lint to enter the screen-perforations, whereupon the rapidly-revolving gin-rollers on the opposite side of the screen assist in drawing the lint through the perforations and away from the cotton-seed, which are unable to pass through the perforations. The current of air is of sufficient volume to carry the lint thus disengaged from the cotton-seed out into the lint-flue R, as indicated by the arrows. The delinted cotton-seed is conveyed by the chain over the sprocket-wheels D' and is discharged into a suitable receptacle.

Having thus described my invention, what I claim is—

1. In a cotton-gin, the combination with a flexible screen, of a conveyer for progressing seed-cotton along the screen, and means for causing the lint to pass through the screen-perforations.

2. In a cotton-gin, the combination with a flexible screen, of a conveyer for progressing seed-cotton along the screen, and means for causing the lint to pass through the screen-perforations, said means consisting in part of a pneumatic device.

3. In a cotton-gin, the combination with a flexible screen, of a conveyer for progressing seed-cotton along the screen, and means for causing the lint to pass through the screen-perforations, said means consisting in part of a mechanical screen-clearer.

4. In a cotton-gin, the combination with a flexible screen, of a conveyer for progressing seed-cotton along the screen, and means for causing the lint to pass through the screen-perforations, said means consisting in part of a pneumatic device and in part of a mechanical screen-clearer.

5. In a cotton-gin, the combination with a flexible screen, of a conveyer for progressing seed-cotton along the screen, and means for causing the lint to pass through the screen-perforations, said means consisting in part of a pneumatic device, said pneumatic device consisting of a blast-fan arranged at the front side of the conveyer and screen.

6. In a cotton-gin, the combination with a flexible screen, of a conveyer for progressing seed-cotton along the screen, and means for causing the lint to pass through the screen-perforations, said means consisting of a rotatory ginning device.

7. In a cotton-gin, the combination with a screen, of a conveyer for progressing seed-cotton along the screen, and means for causing the lint to pass through the screen-perforations, said means consisting of a rotatory ginning device comprising a circular series of rollers acting against the rear of the screen.

8. In a cotton-gin, the combination with a screen, of a conveyer for progressing seed-cotton along the screen, and means for causing the lint to pass through the screen-perforations, said means consisting of a rotatory ginning device comprising a circular series of rollers acting against the rear of the screen and mounted within a rotatory frame.

9. In a cotton-gin, the combination with a screen, of a conveyer for progressing seed-cotton along the screen, and means for causing the lint to pass through the screen-perforations, said means consisting of a rotatory ginning device comprising a circular series of rollers acting against the rear of the screen and mounted within a rotatory frame, the shafts of said rollers being geared to the shaft of the frame by multiplying-gearing, so as to rotate at a higher rate of speed than the frame.

10. In a cotton-gin, a rotary frame, gin-rollers mounted therein, multiplying-gearing between the frame and the gin-rollers, a screen conforming in curvature to the outer sweep of the gin-rollers, and a conveyer for progressing seed-cotton along the screen.

11. In a cotton-gin, a rotary frame, gin-rollers mounted therein, multiplying-gearing between the frame and the gin-rollers, a screen conforming in curvature to the outer sweep of the gin-rollers, and a conveyer for progressing seed-cotton along the screen, a blower directing its blast through the conveyer, screen and rotary frame, and a lint-exit flue.

12. In a cotton-gin, a feed-hopper, a seed-cotton-conveyer chain upon which the hopper discharges, a series of rotatory gin-rollers mounted in a rotatory frame, a screen conforming in shape to the arrangement of the rollers, and sprocket-gears for the conveyer-chains arranged on opposite sides of the gin-rollers.

13. In a cotton-gin, a feed-hopper, a seed-cotton-conveyer chain upon which the hopper discharges, a series of rotatory gin-rollers mounted in a rotatory frame, a screen conforming in shape to the arrangement of the rollers, and sprocket-gears for the conveyer-chains arranged on opposite sides of the gin-rollers, a blower discharging its blast through the conveyer-chain, screen and rotatory frame, and a lint-exit flue.

14. In a cotton-gin, a feed-hopper, a seed-cotton-conveyer chain upon which the hopper discharges, a series of rotatory gin-rollers mounted in a rotatory frame, a screen conforming in shape to the arrangement of the rollers, and sprocket-gears for the conveyer-chains arranged on opposite sides of the gin-rollers and an automatic take-up for the screen.

15. In a cotton-gin, a screen, provided with perforations along its middle portion and having outlying edge portions, in combination with a seed-cotton conveyer having friction-rollers running on said edge portions and means for drawing the cotton through the screen.

16. In a cotton-gin, a screen, a movable screen-clearer coöperating therewith, and a take-up for constantly holding the screen against the screen-clearer.

17. In a cotton-gin, a screen, a movable screen-clearer coöperating therewith, and a take-up for constantly holding the screen against the screen-clearer, said take-up consisting of a weight exerting a longitudinal pull on the screen.

18. In a cotton-gin, a flexible screen, a rotatory screen-clearer partly enveloped by the screen, and a take-up for constantly holding the screen against the screen-clearer, said take-up consisting of a weight exerting a longitudinal pull on the screen.

19. In a cotton-gin, a seed-conveyer, consisting of a series of links provided with series of projecting pins or fingers, and friction-rollers carried by the links to properly space the conveyer from an opposing surface.

20. In a cotton-gin, a seed-cotton conveyer, consisting of a series of skeleton or open links, made up of perforated or slotted main body portions, having pins or fingers projecting therefrom, and friction-rollers journaled in the ends of the links to space the conveyer from an opposing surface.

21. In a cotton-gin, a seed-conveyer made up of a series of links having end standards located beyond the conveying portion of the links and friction-rollers mounted in said standards to maintain the links a fixed distance from an opposed surface, and whose main body portions consist of longitudinal bars separated from each other by intervening spaces, and which bear series of projecting pins or fingers.

In testimony whereof I affix my signature in presence of two witnesses.

JOHN W. GRAVES.

Witnesses:
JOHN C. PENNIE,
HUGH M. STERLING.